2,787,646
Patented Apr. 2, 1957

2,787,646

ORGANIC HALOGEN COMPOUNDS AND METHODS OF MAKING SAME

Robert Neville Haszeldine, Cambridge, England

No Drawing. Application September 2, 1954,
Serial No. 453,956

Claims priority, application Great Britain
September 3, 1953

2 Claims. (Cl. 260—653)

This invention relates to a new process for the synthesis of a class of 3,3,3-trifluoropropenes, to a number of new compounds from such synthesis, and to the preparation of other new compounds useful as reactants in such synthesis and as precursors for such reactants, contained generally within the class of halogenated propenes and propanes.

Halogenated propenes in which the carbon atom remote from the olefinic bond is completely halogenated are known in the literature. Examples include 3,3,3-trichloropropene, 3,3,3-trifluoropropene, 2,3,3,3-tetrachloropropene, and bromo- or chloro-3,3,3-trifluoropropenes. These have been commonly prepared by dehydrohalogenation of the corresponding halogenated propane having an additional terminal chlorine or bromine substituent at the point where the olefinic bond is desired, or by dehalogenation of the corresponding halogenated propane containing two additional bromine or chlorine substituents on the adjacent carbon atoms where unsaturation is desired. It would be useful to be able to prepare fluoropropenes highly fluorinated in the 3-position by fluorinating the corresponding halogenopropenes containing chlorine or bromine where the fluorine is desired, but in every case where such reactions have been attempted, with a halogenopropene containing such terminal structure that the isomerised olefin could yield a different fluoroolefin, either no reaction has occurred or allylic rearrangement has taken place. Thus, Henne and Whaley (JACS 64, 1157 (1942)) reported that 3,3,3-trichloropropene failed to react with antimony trifluoride, and Whaley and Davis (JACS 70, 1026 (1948)) observed allylic rearrangement on treatment of 1,1,2,3,3-pentachloropropene with antimony trifluoride.

I have now discovered a new process for preparing an important class of 3,3,3-trifluoropropenes by simple fluorination of corresponding halogenopropenes, and in connection with this process I have further discovered a number of new chemical compounds which are either a number of new chemical compounds which are either starting materials used in my new process of preparing 3,3,3-trifluoropropenes, or are intermediates yielded during the preparation of such starting materials or immediate derivatives of such intermediates. The new products of my invention are potentially useful, not only as chemical intermediates to produce many other organic fluorine compounds, but also as monomers for plastics, or intermediates for preparation of such monomers. By way of illustration of the use of these products as chemical intermediates, it may be noted that each of my new products is either a fluoroolefin or a precursor of such an olefin and that such olefins can be converted into sulfonic acids which have useful surface active properties, for example, by addition of hydrogen sulfide to the olefin to give a product which can be oxidized to a sulfonic acid.

The essential reaction in the new process of my invention may be represented by the equation:

$$CMZ_2CX=CHY \xrightarrow{\text{Fluorinating Agent}} CF_3CX=CHY$$

where X is H, Cl, or Br,
Y is H, Cl, or Br,
Z is F, Cl, or Br, and
M is Cl, or Br.

In the process represented above, the halogenopropene starting material is reacted with a fluorinating agent under essentially anhydrous conditions, in the absence of any acid or Friedel-Crafts catalyst which would bring about rearrangement of the starting material, and at a temperature below that at which rearrangement of the starting material would occur in the absence of said fluorinating agent. Suitable fluorinating agents include antimony trifluoride, antimony trifluorodichloride, antimony trifluorodibromide, or any other fluorinating agent that does not introduce water, an acid, or a Friedel-Crafts type catalyst which could bring about rearrangement of the starting material. In order to give some guidance as to the temperatures which may be used for the reaction, it may be stated that, with antimony trifluoride as the fluorinating agent, temperatures below about 100° C. are in general suitable. Thus, contrary to the teaching of the prior art that the above reaction either does not occur or is accompanied by allylic rearrangement, I have found that the reaction can be carried out with good yield provided it is done under the conditions above specified.

It was surprising to find that even a small amount of moisture present with a fluorinating agent such as antimony trifluoride could have such a marked effect on the nature of the reaction. The moisture evidently reacts with the fluoride to form a small amount of acid and it is this that catalyses the allylic rearrangement of the starting olefin into an isomer which is either much less susceptible to fluorination or, if it does become fluorinated, yields, of course, a different product than that indicated above. To show the effect of acid in catalysing isomerisation of an olefin of the type shown; in separate experiments, three grams of 3,3,3-trichloropropene were mixed at 20° C., in the one case, with two drops of concentrated hydrochloric acid, in another case with two drops of concentrated sulfuric acid. The conversion to 1,1,3-trichloropropene was found to be 71% complete in one case and 75% complete in the other. Heating at a temperature of 140° C. gave essentially the same result and contact with less than 2% by weight of aluminium chloride (a typical Friedel-Crafts catalyst) at —10° C. resulted in 65% isomerisation.

The preferred process of my invention involves applying the method above described to that class of halogenoolefins, conforming to the type formula above given, that exhibits to a marked degree the tendency to undergo allylic rearrangement under the conditions described in the preceding paragraph.

In applying my process to produce particular products, the above-noted reaction may be preceded by one or more preliminary reactions to produce necessary or desirable intermediates as more fully discussed hereinafter.

The following equations are illustrative of reactions carried out by the process of my invention. In each instance, the fluorinating agent was either anhydrous antimony trifluoride, anhydrous antimony trifluorodichloride, or mixtures of these. No other material was present except anhydrous organic solvents such as ethylene dichloride. Temperatures ranged from —5° C. to 75° C.

(1) $CCl_3CH=CH_2 \rightarrow CF_3CH=CH_2$
(2) $CCl_3CCl=CH_2 \rightarrow CF_3CCl=CH_2$
(3) $CCl_3CBr=CH_2 \rightarrow CF_3CBr=CH_2$
(4) $CF_2ClCBr=CH_2 \rightarrow CF_3CBr=CH_2$
(5) $CF_2ClCH=CH_2 \rightarrow CF_3CH=CH_2$
(6) $CCl_2BrCBr=CH_2 \rightarrow CF_3CBr=CH_2$
(7) $CCl_3CH=CHCl \rightarrow CF_3CH=CHCl$ In Equation 1 above, the starting material, 3,3,3-trichloropropene, the precursor for 3,3,3-trifluoropropene, is conveniently prepared by dehydrochlorination of 1,1,1,3-tetrachloropropane or dehydrobromination of 3-bromo-1,1,1-trichloropropane. The starting material shown for Reaction 2 above is similarly prepared by dehydrohalogenation of the appropriate pentachloropropane, or bromotetrachloropropane, and the starting material for Reaction 3 above from the appropriate bromotetrachloropropane or dibromotrichloropropane.

The starting materials for Reactions 4 and 6 above are new chemical compounds and they can advantageously be made by a series of reactions set out below, which produce several other new chemical compounds as intermediates. Thus, to produce the starting material for Reaction 4 above, the following two reactions are suitable:

$$CCl_3CH_2CH_2Br \xrightarrow{SbF_3Cl_2} CF_2ClCH_2CH_2Br + CF_2ClCHBrCH_2Cl$$

$$CF_2ClCHBrCH_2Cl \xrightarrow[KOH]{alcoholic} CF_2ClCBr=CH_2$$

All three reaction products of the above two reactions are new chemical compounds.

To produce the starting material for Reaction 5 above at least three different routes are available. These are shown below, the three sets of reactions being designated (a), (b), and (c) respectively. All products of reaction are not necessarily shown in each case, but only those of significance to the subsequent reactions.

(a)
$$CCl_3CH_2CH_2Br \xrightarrow[\text{or}~SbF_3Br_2]{SbF_3Cl_2} CF_2ClCH_2CH_2Br + CF_2ClCHBrCH_2Cl$$

$$CF_2ClCH_2CH_2Br \xrightarrow[KOH]{alcoholic} CF_2ClCH=CH_2$$

(b)
$$CCl_3CH_2CH_2Br \xrightarrow{SbF_3Cl_2} CF_2ClCH_2CH_2Br + CF_2ClCHBrCH_2Cl$$

$$CF_2ClCHBrCH_2Cl \xrightarrow[\text{acetic acid}]{Zn~\&} CF_2ClCH=CH_2 + CH_2CH=CF_2$$

(c)
$$CCl_3CH_2CH_2Cl \xrightarrow{SbF_3Cl_2} CF_2ClCH_2CH_2Cl$$

$$CF_2ClCH_2CH_2Cl \xrightarrow[KOH]{alcoholic} CF_2ClCH=CH_2$$

The product 3,3,3-difluorochloropropene, which is the final product of each of the above series of Reactions a, b, and c, and is the starting material for Reaction 5 above, may, by suitable reactions, provide additional starting materials for use in reactions like those designated as (1) to (7) above. For example, it may be brominated to produce the dibromide $CF_2ClCHBrCH_2Br$ and may be chlorinated to produce the dichloride $$CF_2ClCHClCH_2Cl$$

Both of these are new chemical compounds. The former of these, upon dehydrobromination, provides a new route to the starting material for Reaction 4 above while the latter compound, namely, $CF_2ClCHClCH_2Cl$, upon dehydrochlorination, gives the new compound $$CF_2ClCCl=CH_2$$

which is also a suitable reactant for reactions like those of (1) to (7) above.

The starting material for Reaction 6 above may be made by the following series of reactions:

$$CH_2ClCH=CCl_2 \xrightarrow{Br_2} CH_2ClCHBrCCl_2Br$$

$$CCl_2BrCHBrCH_2Cl \xrightarrow[KOH]{alcoholic} CCl_2BrCBr=CH_2$$

Both reaction products of the above reactions are new chemical compounds and the first is of further interest in that, upon fluorination by means of antimony trifluoride, it yields still another new compound, namely, 2-bromo-1-chloro-3,3,3-trifluoropropane.

The following examples, in which all parts are by weight are illustrative of the process and products of my invention:

*Example I.—Preparation of 3,3,3-trifluoropropene*

(a) *Preparation of 1,1,1,3-tetrachloropropane.*—The procedure of Joyce, Hanford & Harmon (JACS 70, 2529 (1948)) was followed, using carbon tetrachloride (100 parts), ethylene (50 atmospheres) and benzoyl peroxide (0.9 parts) in an autoclave. The temperature was slowly increased to 100° C. during 24 hours, and as the pressure dropped more ethylene was added. Distillation gave 1,1,1,3-tetrachloropropane.

(b) *Dehydrochlorination.*—To 1,1,1,3-tetrachloropropane (50 parts) in ethanol (25 parts), stirrred and cooled to —10° C. was slowly added 10% ethanolic potassium hydroxide (10% excess). An immediate precipitate of potassium chloride was observed, and after stirring for 1 hour at 0° C. an excess of water was added, and the lower layer was washed with water, dried (CaCl₂) and distilled to give 3,3,3-trichloropropene (57% yield), 1,1,3-trichloroprop-1-ene (30% yield), starting material (2%), 1,1-dichloro-3-ethoxy-prop-1-ene (a new compound) (5% yield), and unidentified material of higher boiling point (5% yield).

(c) *Conversion of 3,3,3-trichloropropene to 3,3,3-trifluoropropene.*—Resublimed anhydrous antimony trifluoride (30 parts) was vigorously stirred and treated with chlorine until the ratio of SbF₃:SbF₃Cl₂ was 9:1. Dried ethylene dichloride (20 parts) was added, then, dropwise (2 hrs.) at —10° C. to —5° C., a solution of 3,3,3-trichloropropene (10.0 parts) in ethylene dichloride (5 parts). The reaction, which is smooth and easily controlled only if efficient stirring is maintained, was completed by heating to 60° C. Distillation of the volatile product in a vacuum system gave 3,3,3-trifluoropropene.

*Example II.—Preparation of precursor for 2-bromo-3,3,3-trifluoropropene*

Bromine was absorbed by 3,3,3-trichloropropene (5.0 parts) at 20° C. to give 1,2-dibromo-3,3,3-trichloropropane in 95% yield, boiling point 100–101 C./10 mm., $n_D^{20}$ 1.562. The compound reported as 1,2-dibromo-3,3,3-trichloropropane is a solid, melting point 210° C., but since it was obtained from what is now known to be 1,1,2-trichloropropene, this solid is actually 1,2-dibromo-1,1,2-trichloropropane; a specimen prepared from authentic 1,1,2-trichloropropene had melting point 216° C. Ice-cold 10% ethanolic potassium hydroxide (5% excess) was added to 1,2-dibromo-3,3,3-trichloropropane (4.1 parts) at 0–5° C. to give 2-bromo-3,3,3-trichloropropene (61% yield), boiling point 81–82° C./30 mm., $n_D^{20}$ 1.535. Conversion of this to the bromotrifluoropropene by the process of my invention is described in Example IV.

*Example III.—Reactions to produce another precursor for 2-bromo-3,3,3-trifluoropropene*

1,1,3-trichloroprop-1-ene (3.7 parts) was reacted with bromine at 10° C. with exposure to ultraviolet light for 1 hour in a Pyrex vessel to give 1,2-dibromo-1,1,3-trichloropropane (66% yield), boiling point 105–6° C./11 mm.

This dibromide may be dehydrochlorinated as described in Example I to give 2,3-dibromo-3,3-dichloropropene, which may be converted to 2-bromo-3,3,3-trifluoropropene by the procedure of my invention as described in Example IV.

Another interesting reaction of the dibromide is its treatment with a 50% excess of antimony trifluoride containing 40% antimony trifluorodichloride at 90° C. for 12 hours in a vigorously shaken autoclave to give 2-bromo-1-chloro-3,3,3-trifluoropropane (58% yield), boiling point 94–96° C. The same reaction carried out at 50° C. gave as by-product 2-bromo-1,3-dichloro-1,1-difluoropropane (15% yield), boiling point 133.5–134° C., $n_D^{25}$ 1.444.

*Example IV.—Conversion of chloro-and bromo-3,3,3-trihalogenopropenes to the corresponding 3,3,3-trifluoropropenes*

Antimony trifluoride (20 parts, containing 10% SbF$_3$Cl$_2$) was slowly heated from −5 to 55° C. with 2,3,3,3-tetrachloropropene (4.1 parts) and ethylene dichloride (10 parts) to give 2-chloro-3,3,3-trifluoropropene (59% yield), boiling point 15.5° C. 2-bromo-3,3,3-trichloropropene (2.2 parts) similarly yielded 2-bromo-3,3,3-trifluoropropene (64% yield), boiling point 33–34° C. Similarly, the 2,3-dibromo-3,3-dichloropropene of Example III yields 2-bromo-3,3,3-trifluoropropene.

*Example V.—Preparation of 3-chloro-3,3-difluoropropene and 2-bromo-3-chloro-3,3-difluoropropene, new precursors for trifluoropropenes*

Antimony trifluoride (70 parts) and antimony trifluorodi-chloride (80 parts) were thoroughly mixed at 60° C., then cooled to 20° C. A solution of 1-bromo-3,3,3-trichloropropane (52 parts) in benzotrifluoride (20 parts) was added (3 hours) at 20–25° C. and the temperature was then raised to 60° C. for 30 minutes. Steam distillation, etc., gave 1-bromo-3,3,3-trifluoropropane (51% yield), boiling point 62–64° C., $n_D^{20}$1.360, identified by infra-red spectroscopic examination, a fraction (boiling point 98–107° C.) which contained benzotrifluoride, 1-bromo-3-chloro-3,3-difluoropropane (ca. 15% determined by treatment of the mixture with alcoholic potash and separation of the olefin by distillation), and 2-bromo-1,3-dichloro-1,1-difluoropropane, a new compound, (20% yield), boiling point 133–134° C., $n_D^{18}$1.448.

In a second experiment, antimony trifluoride (150 parts) was converted into antimony trifluorodichloride (50%), and to it was added 1-bromo-3,3,3-trichloropropane (43.5 parts) in the absence of a solvent. Efficient stirring was essential to prevent extensive decomposition. After 3 hours at 25° C., the temperature was raised to 75° C. for 30 minutes. The products were 1-bromo-3,3,3-trifluoropropane (42% yield), boiling point 63–64° C., 1-bromo-3-chloro-3,3-difluoropropane, a new compound (11% yield), boiling point 99–102° C., on redistillation 100–100.5° C., $n_D^{20}$1.362, and 2-bromo-1,3-dichloro-1,1-difluoropropane (30% yield), boiling point 130–134° C.

At 40° C., the bromotrichloropropane (46.2 parts) gave 1-bromo-3,3,3-trifluoropropane (19% yield), boiling point 63–65° C., 1-bromo-3-chloro-3,3-difluoropropane (39% yield), boiling point 100–103° C., 2-bromo-1,3-dichloro-1,1-difluoropropane (10% yield), boiling point 132–135° C. and starting material (15% yield). 1-bromo-3,3-dichloro-3-fluoropropane was not detected.

The last two experiments above were repeated, using bromine instead of chlorine to produce Sb$^v$ salts. 1-bromo-3,3,3-trichloropropane (45 parts), treated at a maximum of 75° C., and the products removed by pumping, gave 1-bromo-3,3,3-trifluoropropane (53% yield), boiling point 99–102° C., and 2-bromo-1,3-dichloro-1,1-difluoropropane (7% yield), boiling point 132–135° C. with a maximum reaction temperature of 40° C., the bromotrichloropropane (45 parts) gave 1-bromo-3,3,3-trifluoropropane (26% yield), 1-bromo-3-chloro-3,3-difluoropropane (42% yield), and starting material (17% yield).

*Dehydrobromination of 1-bromo-3-chloro-3,3-difluoropropane.*—To the compound (5.6 parts), dissolved in ethanol (5 parts), and cooled to 10° C., was added dropwise (1 hour) a 10% excess of ice-cold 10% ethanolic potassium hydroxide. Dilute hydrochloric acid was then added in excess, and air was blown through the solution. The combined volatile products were fractionated in a vacuum system to give 3-chloro-3,3-difluoropropene (78% yield), boiling point 18° C., a precursor for synthesis of 3,3,3-trifluoropropene by the process of my invention, as described in Example VI.

*Dehydrochlorination of 1,3-dichloro-1,1-difluoropropane.*—The compound (3.1 parts) treated as in the last experiment gave 3 - chloro-3,3-difluoropropene (84% yield), boiling point 17.5° C., identical with the compound described in the preceding paragraph.

The dehydrochlorination technique described above for 1,3-dichloro-1,1-difluoropropane was applied to 2-bromo-1,3-dichloro-1,1-difluoropropane (8.2 parts) to give 2-bromo-3-chloro-3,3-difluoropropene (89% yield), boiling point 78.5–79.0° C., $n_D^{20}$1.415, a new precursor for 2-bromo-3,3,3-trifluoropropene by the process of my invention, as described in Example VI.

*Example VI.—Conversion of the halogenopropenes of Example V to the corresponding 3,3,3-trifluoropropenes*

2-bromo-3-chloro-3,3-difluoropropene (4.3 parts) was added dropwise to a stirred suspension of antimony trifluorodichloride (10 parts) and antimony fluoride (5 parts) in ethylene dichloride (10 parts) at 20° C. to give 2-bromo-3,3,3-trifluoropropene (85% yield), boiling point 33° C. (isoteniscope).

Applying the above technique to 3-chloro-3,3-difluoropropene gives 3,3,3-trifluoropropene in good yield.

*Example VII.—Another preparation for 3-chloro-3,3-difluoropropene*

2-bromo-1,3-dichloro-1,1-difluoropropane (Examples III and V) (10.7 parts) in ethanol 20 parts) was added dropwise (1.5 hours) to zinc (30 parts) and refluxing ethanol (30 parts) in a flask fitted with reflux condenser at 25° C. At the end of the reaction an excess of water was added, and the flask was swept out with nitrogen. Chloride and bromide had been formed in equimolar amount. The combined volatile products were fractionated to give 3-chloro-3,3-difluoropropene (72% yield), boiling point 17° C., shown by its infra-red spectrum to be identical with the material described in Example V as obtained by dehydrobromination of 1-bromo-3-chloro-3,3-difluoropropane and the material (Example V) obtained by dehydrochlorination of 1,3-dichloro-3,3-difluoropropane. 1,1-difluoroprop-1-ene, boiling point −29° C., was also obtained in 21% yield. This is a new and useful process for making the olefin CH$_3$CH=CF$_2$.

The above dehalogenation experiment was repeated with glacial acetic acid in place of ethanol. 2-bromo-1,3-dichloro-1,1-difluoropropane (6.3 parts) gave 3-chloro-3,3-difluoropropene (41% yield) and 1,1-difluoroprop-1-ene (52% yield), separated in the vacuum system and identified by infra-red spectroscopic examination.

*Example VIII.—Other precursors for 3,3,3-trifluoropropenes syntheses starting from 3-chloro-3,3-difluoropropene*

The latter compound (2.0 parts), treated with a slight excess of bromine in a Pyrex vessel exposed to ultraviolet light yielded 1,2-dibromo-3-chloro-3,3-difluoropropane quantitatively, boiling point 151–152° C., $n_D^{21}$1.474. The dibromide (3.1 parts) was treated at 0° C. with ethanolic potassium hydroxide to give 2-bromo-3-chloro-3,3-difluoropropene (89% yield), boiling point 78.5° C., $n_D^{20}$1.415. Conversion of this olefin to the bromotrifluoropropene by the process of my invention is described in Example VI.

Chlorine (slight excess) was reacted with 3-chloro-3,3-difluoropropene (3.1 parts) at 0° C. on exposure to ultraviolet light to give 1,2,3-trichloro-1,1-difluoropropane (98% yield), boiling point 113° C., $n_D^{20}$ 1.415. This trichloride (4.1 parts) treated with ethanolic potassium hydroxide at 0° C. gave 2,3-dichloro-3,3-difluoropropene (91% yield), boiling point 57–58° C., $n_D^{22}$ 1.378, another new olefin which may be used in practising the process of my invention as described in the next example.

Example IX

The last compound (1.75 parts) was sealed with a 1:1 mixture of SbF₃ and SbF₃Cl₂ and set aside at 30° C. for 1 hour. Fractionation in vacuo then gave 2-chloro-3,3,3-trifluoropropene (81% yield), boiling point 15° C.

It will be obvious to those skilled in the art that many modifications may be made within the scope of the present invention without departing from the spirit thereof and the invention includes all such modifications. The novel compounds disclosed herein are claimed in my copending application Serial No. 612,869, filed September 28, 1956.

I claim:

1. A process which comprises treating a compound of the formula $CMZ_2CX=CH_2$ in which M is selected from the group consisting of chlorine and bromine, Z is selected from the group consisting of fluorine, chlorine and bromine, and X is selected from the group consisting of hydrogen, chlorine and bromine; with an acid-free, anhydrous fluorinating agent selected from the group consisting of antimony trifluoride, antimony trifluorodichloride and antimony trifluorodibromide, at a temperature below that at which rearrangement of the starting material would occur in the absence of said fluorinating agent, to produce a compound of the formula $CF_3CX=CH_2$ in which X is as given above.

2. A process according to claim 1 in which the fluorinating agent is antimony trifluoride and in which the temperature of the reaction is below about 100° C.

References Cited in the file of this patent

UNITED STATES PATENTS 2,558,703    Gochenour _____ June 26, 1951

FOREIGN PATENTS 623,227    Great Britain _____ May 13, 1949
581,662    Great Britain _____ Oct. 21, 1946

OTHER REFERENCES

Davis: J. A. C. S., vol. 70, pages 1026–7 (1948), CA 42:4517–8.

Henne et al.: J. A. C. S., vol. 63, pages 3478–9 (1941).